United States Patent
Ou et al.

(10) Patent No.: US 7,275,120 B2
(45) Date of Patent: Sep. 25, 2007

(54) CONFIGURABLE ADVANCED TECHNOLOGY ATTACHMENT/INTEGRATED DRIVE ELECTRONICS HOST CONTROLLER WITH PROGRAMMABLE TIMING REGISTERS THAT STORE TIMING PARAMETERS THAT CONTROL COMMUNICATIONS

(76) Inventors: Michael Ou, 35343 Rutland Ct., Newark, CA (US) 94560; Lyle E. Adams, 1602 Flower Garden La., San Jose, CA (US) 95124; Edward Yan, 2595 Junction Ave. Suite 200, San Jose, CA (US) 95134

( * ) Notice: Subject to any disclaimer, the term of this patent is extended or adjusted under 35 U.S.C. 154(b) by 481 days.

(21) Appl. No.: 10/846,739

(22) Filed: May 14, 2004

(65) Prior Publication Data

US 2004/0267972 A1  Dec. 30, 2004

Related U.S. Application Data

(60) Provisional application No. 60/470,642, filed on May 15, 2003, provisional application No. 60/531,517, filed on Dec. 19, 2003, provisional application No. 60/538,453, filed on Jan. 22, 2004, provisional application No. 60/563,183, filed on Apr. 16, 2004.

(51) Int. Cl.
*G06F 3/00* (2006.01)
*G06F 5/00* (2006.01)
*G06F 13/00* (2006.01)
*G06F 13/14* (2006.01)

(52) U.S. Cl. .................. 710/58; 710/300; 710/305; 710/8

(58) Field of Classification Search ............ 710/36–51, 710/58; 711/169; 713/400–502
See application file for complete search history.

(56) References Cited

U.S. PATENT DOCUMENTS

| | | | | |
|---|---|---|---|---|
| 4,893,271 | A | * | 1/1990 | Davis et al. ................. 713/501 |
| 5,394,541 | A | * | 2/1995 | Chesley et al. ............. 711/167 |
| 5,579,025 | A | * | 11/1996 | Itoh ............................. 345/3.2 |
| 6,779,062 | B1 | * | 8/2004 | Eschmann et al. ............ 710/74 |
| 2003/0149906 | A1 | * | 8/2003 | Wang .......................... 713/500 |
| 2004/0030821 | A1 | * | 2/2004 | Qiu ............................. 710/315 |

\* cited by examiner

*Primary Examiner*—Donald Sparks
*Assistant Examiner*—Brooke J Dews
(74) *Attorney, Agent, or Firm*—Klarquist Sparkman, LLP

(57) ABSTRACT

An ATA/IDE host controller 100 generated from an HDL design base and a default frequency configuration script is disclosed. The controller supports ATA/IDE interface communications at a user-selected default frequency of 33, 66, 100, or 133 Mhz and at frequencies other than the default frequency using a set of programmable override timing registers 121. An internal timing control module 110 provides either the default timing parameters or the override timing parameters to the IDE host interface 102, according to the programmable override control 301.

19 Claims, 3 Drawing Sheets

CONFIGURABLE ADVANCED TECHNOLOGY ATTACHMENT/INTEGRATED DRIVE ELECTRONICS HOST CONTROLLER WITH PROGRAMMABLE TIMING REGISTERS THAT STORE TIMING PARAMETERS THAT CONTROL COMMUNICATIONS

CROSS REFERENCE TO RELATED APPLICATIONS

This application claims the benefits of the earlier filed U.S. Provisional Application Ser. No. 60/470,642, filed 15 May 2003, the earlier filed U.S. Provisional Application Ser. No. 60/531,517, filed 19 Dec. 2003, the earlier filed U.S. Provisional Application Ser. No. 60/538,453, filed 22 Jan. 2004, and the earlier filed U.S. Provisional Application Ser. No. 60/563,183, filed 16 Apr. 2004, all of which are incorporated by reference for all purposes into this specification.

Additionally, this application is related to U.S. Pat. No. 6,601,126, filed 2 May 2000, entitled "Chip-core framework for systems-on-chip", and U.S. patent application Ser. No. 10/602,581, entitled "System-on-Chip (SOC) Architecture With Arbitrary Pipeline Depth" which is a continuation of the earlier filed U.S. patent application Ser. No. 10/180,866, filed 26 Jun. 2002 and claims the benefits of the earlier filed U.S. Provisional Application Ser. Nos. 60/300,709, filed 26 Jun. 2001; 60/302,864, filed 5 Jul. 2001; 60/304,909, filed 11 Jul. 2001; and 60/390,501, filed 21 Jun. 2002. All of these documents are incorporated by reference for all purposes into this specification.

BACKGROUND OF THE INVENTION

1. Field of the Invention

The present invention relates to computer systems and systems-on-a-chip (SOCs). More specifically, the present invention relates to IDE controllers used in computers and SOCs to communicate with external devices and systems.

2. Description of the Related Art

The ATA/IDE interface has evolved over the past several years to support faster timings for greater data bandwidth on the interface. Starting with the initial ATA/IDE specification, entitled "0791 M AT Attachment Interface for Disk Drives" (ATA-1), which was developed under the authority of the American National Standards Institute (ANSI) by Technical Committee 13 of the International Committee on Information Technology Standards (INCITS), there have been several revisions to support more data throughput across the interface. The introduction of the Ultra DMA 33 protocol allowed ATA/IDE devices to transfer data at rates up to 33 MB per second. The next revision, Ultra DMA 66, allowed data transfer rates that were twice as fast, up to 66 MB per second. Two subsequent revisions, Ultra DMA 100 and more recently Ultra DMA 133 allowed for data to be transmitted at rates of 100 MB per second and 133 MB per second, respectively. The original ATA/IDE specification and all subsequent revisions are available from the American National Standards Institute at 25 West 43rd Street, New York, N.Y. 10036, and are incorporated by reference for all purposes into this specification.

When Ultra DMA 33 was initially introduced, companies designed controllers to support the new ATA/IDE Ultra DMA 33 compliant devices. Much of the design involved handling the signaling interface to meet the proper timing required by the specification. The design was typically implemented using state machines and counters with hard coded values. This hardware would generate the control signals and data strobes to match the timing parameters required by the Ultra DMA 33 specification. These designs also used a system clock frequency of 33 Mhz, which is the native clock frequency for running Ultra DMA 33 transfers. When the Ultra DMA 66 specification came out, companies had to design new controllers to handle the updated timings to the specification. These controllers were implemented again in a similar fashion using state machines and counters with hard coded timing parameter values to meet the timing requirements on the Ultra DMA 66 interface. The controllers used a clock frequency of 66 Mhz, which is the native clock frequency for Ultra DMA 66 transfers.

As the next generation specifications for Ultra DMA 100 and Ultra DMA 133 were defined, new controllers were introduced supporting these latest interfaces, but these either did not fully support the previous Ultra DMA 33 or Ultra DMA 66 interfaces (and Ultra 100 when Ultra DMA 133 was introduced) or did not run at an optimal transfer rate when running at those slower speeds. This was not an issue in many systems, since the controller designs were optimized in terms of gate counts and performance for the highest interface speed, and these designs were typically used in a single project or environment for a specific clock frequency and device speed (e.g. operation at 133 Mhz to work only with Ultra DMA 133 devices).

However, problems with reuse arose when a host controller targeted for one clock frequency and device speed needed to support multiple systems that ran at different clock frequencies and had to support multiple Ultra DMA speeds. Normally, a different controller had to be used for each system to accommodate that system's interfaces and operating frequencies. Ultra DMA 33's natural clock frequency runs at 33 Mhz (30 ns clock period). Similarly, Ultra DMA 66 runs at 66 Mhz (15 ns clock period), Ultra DMA 100 at 100 Mhz (10 ns clock period), and Ultra DMA 133 runs at 133 Mhz (7.5 ns clock period). A controller designed to handle Ultra DMA 133 transfers assumes a system clock speed of 133 Mhz and thus defines its timing parameters in number of clock cycles, where a clock cycle has a 7.5ns period. Internal counters in the design check to make sure that enough clock cycles have elapsed to meet the minimum timing parameter for a transaction, or that a signal has changed before the maximum timing requirement for a specific transaction is reached. A controller optimized for use in a 133 Mhz system cannot be used in a slower system (for example, one designed for Ultra DMA 33 transfers that uses a 33 Mhz input clock having a 30ns clock period), because all of the timing parameters must be recalculated. For example, a transaction or event with a maximum allowed timing of 70ns can be met with a defined timing parameter of 8 clock cycles (60ns total) in a system running at 133 Mhz, but when the system clock is slowed down to 33 Mhz, the 8-clock cycle requirement translates to 240 ns. This exceeds the allowable maximum time allocated for the transaction.

Supporting all of the Ultra DMA modes (Ultra DMA 33, Ultra DMA 66, Ultra DMA 100 and Ultra 133) at their native clock frequencies (33 Mhz, 66 Mhz, 100 Mhz and 133 Mhz, respectively) required four different versions of the host controller, one for each clock frequency. While optimizing a host controller for a specific system enabled designers to save on the number of gates and achieve a more efficient design for the specific application, an obvious disadvantage to this approach is design maintenance. Supporting and maintaining at least four different designs is clearly more difficult that supporting and maintaining one design.

To address this issue, designers created a single hardware description language design base that included configuration directives specifying which speed a specific instantiation of the design would be optimized for. This approach allowed all of the different hard coded parameters to exist within a single design base. For example, a host controller base design described in Verilog would use the "ifdef" construct, coupled with a special identifier, to specify which speed a design being instantiated is optimized for. Similar constructs exist for other HDL languages. This technique can generate hard coded parameters for the four native clock frequencies (33 Mhz, 66 Mhz, 100 Mhz, and 133 Mhz) for each Ultra DMA transfer mode (Ultra DMA 33, Ultra DMA 66, Ultra DMA 100, and Ultra DMA 133, respectively) as well as the other data transfer modes (Taskfile Accesses, PIO Data Transfers and Multiword DMA Transfers). Using this approach, when a host controller is required for a particular transfer speed, special scripts that invoke the configuration directives are used to preserve the proper hard coded parameters for that particular frequency and strip the other parameters out. This generates an optimized design in terms of timing and performance with the proper hard coded parameters from the design base. This approach simplifies maintenance of the design, since only one design base needs to be maintained.

While partially addressing the multiple-design maintenance issue, using a configuration directive script with the generic design base still results in different hardware configurations, and therefore, does not enable the use of a single controller configuration which supports different systems and different clock frequencies. This is a problem in SOCs that have an integrated ATA/IDE host controller, because SOC manufacturers want their chips to be usable across a variety of environments, even though each environment may be running at a different clock frequency. In addition, some systems may not even run their system clock frequencies at the native speeds of 33 Mhz, 66 Mhz, 100 Mhz or 133 Mhz. For example, some environments might have to run at faster speeds (166 Mhz, 200 Mhz) or non-native frequencies (40 Mhz, 80 Mhz, etc) due to system synchronization issues or foundry process limitations. Obviously, a single design having hard coded parameters—even one generated from a generic design base using a configuration directive script— cannot be used across all of these different environments.

An ATA/IDE host controller that provides support for non-native clock frequencies and that is usable across multiple environments running at different clock frequencies is therefore required. The present invention is such a device. The ATA/IDE host controller of the present invention uses special programmable registers that allow default hard-coded timing parameters to be overridden by values programmed to insure compliance with ATA/IDE timing requirements under the current operating parameters of the system environment in which the host controller is operating. This allows the system user to use the present invention's default timing parameters, or to reprogram the timing parameters when the present invention is used in a system environment with a different clock frequency. In addition, the present invention supports on-the-fly timing parameter reprogramming, to enable its use in systems that allow the system clock frequency to change during regular operation. For example, some systems reduce clock frequencies on-the-fly to minimize power consumption or to reduce heat generation. Reprogramming timing parameters on the fly allows the present invention to continue to support the same ATA/IDE transactions at the same data rate, even when the system clock frequency is reduced.

SUMMARY OF THE INVENTION

The present invention is an ATA/IDE host controller that includes an IDE host interface that communicates with ATA/IDE devices in accordance with a user-specified protocol, a timing control module that provides default timing parameters to the IDE host interface, and a set of programmable override timing registers that store override timing parameters. Some embodiments may not include default timing parameters, and instead, control all communications over the IDE host interface using timing parameters stored in the override timing registers. In embodiments that include both default timing parameter and override parameters, the override logic controls whether the IDE host interface uses the default timing parameters for its communications with IDE devices, or whether the override timing parameters currently stored in the programmable override timing registers are used instead. The default timing parameters are defined according to a clock signal having a user-selected default frequency, and the override timing parameters are calculated using the period of a clock signal having a frequency different from the user-selected default frequency. The override control is reset to the default configuration at power-on-reset, and if the default clock frequency changes to a new frequency, the present invention stores override timing parameters determined according to the new clock frequency and provides those override timing parameters to the IDE host interface. Override timing parameters can be changed on the fly.

In the present invention, the override timing parameters are either the number of clock cycles that must elapse after a specified signal communicating over said IDE interface is asserted before a specified event happens, or the number of clock cycles that must elapse after a specified signal communicating over said IDE interface is negated before a specified event happens.

Finally, the host controller apparatus design is generated from a hardware description language design base and a configuration script, where the combination of the hardware description language design base and the configuration script generate a host controller apparatus design having default timing parameters optimized for one of the following default operating frequencies: 33 Mhz, 66 Mhz, 100 Mhz, or 133 Mhz.

DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention is a method and apparatus for an ATA/IDE host controller used to control communications with ATA/IDE devices. The ATA/IDE host controller of the present invention includes a set of programmable timing registers referred to herein as SpeedSelect registers that override the host controller's default timing parameters to enable the host controller to be reconfigured on the fly to support a wide range of system clock frequencies and target interfaces for all transfer types. This disclosure describes numerous specific details that include specific interfaces, timings, signal requirements, and register structures in order to provide a thorough understanding of the present invention. One skilled in the art will appreciate that one may practice the present invention without these specific details.

The ATA/IDE host controller described herein allows a system host processor to perform various types of data transfers to ATA/IDE target devices. One or more target devices are supported, and multiple ATA/IDE target devices can be controlled with one or more instantiations of the base ATA/IDE host controller design. Transactions are performed according to the ATA/IDE specifications referenced above and incorporated into this disclosure. While this disclosure includes some ATA/IDE interface and signal information to add clarity to the specific discussion and examples, more detailed information about the ATA/IDE interface requirements, including specific transaction parameters and signal sequences can be found by referring to ATA/IDE specifications.

Figure 1:
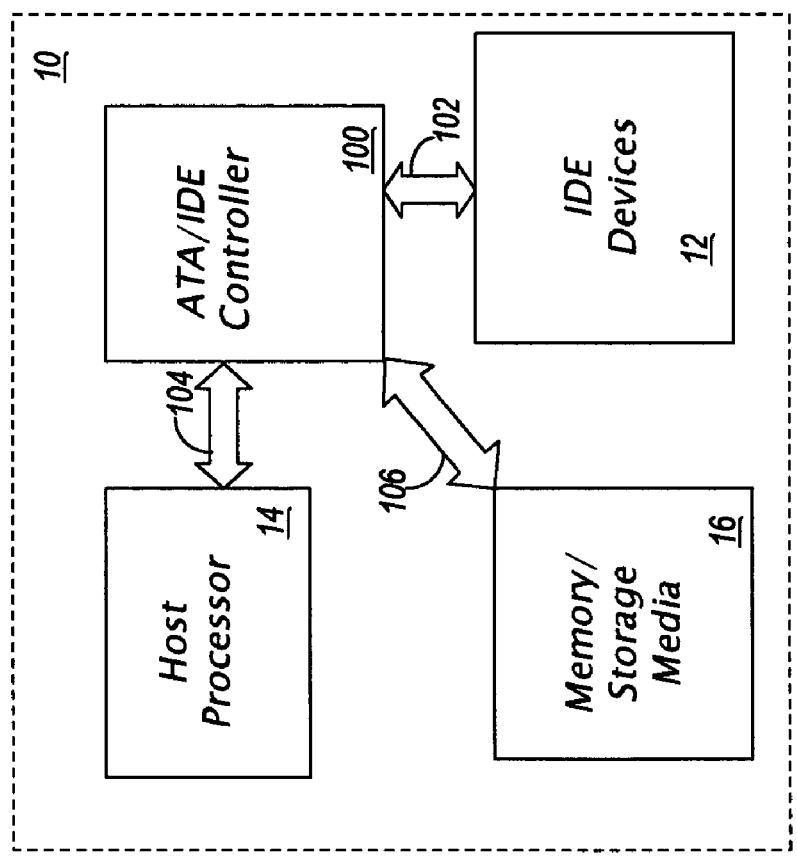
FIG. 1 is a conceptual block diagram showing the host controller 100 of the present invention implemented in the context of a larger system design 10.

The ATA/IDE Host controller design base is described in a hardware description language (HDL). The preferred HDL language is Verilog, but VHDL or other descriptive languages familiar to those skilled in the art can also be used to create the design base. FIG. 1 is a conceptual block diagram showing the host controller 100 of the present invention implemented in the context of a larger system design 10. Those skilled in the art will recognize that incorporating system 10 will ordinarily include a host processor 14 and one or more types of computer readable storage media 16, or alternatively, will enable communications between the host controller 100 and a host processor 14 and one or more types of storage media 16. The ATA/IDE host controller 100 of the present invention communicates with IDE devices 12 over the ATA/IDE signal interface 102 according to the ATA/IDE standard. IDE devices 12 may be both incorporated into and/or external to incorporating system 10. Additionally, the host processor 14 and/or Memory/Storage Media 16 may also be incorporated into and/or external to the system. The ATA/IDE host controller 100 of the present invention communicates over a peripheral control interface 104 with the host processor 14. This communication enables reading and writing of the internal ATA/IDE Host controller registers, including the programmable timing override registers, referred to herein as the SpeedSelect registers. Finally, the host controller 100 of the present invention communicates over system memory interface 106, which allows the ATA/IDE Host controller design to read and write data from system memory, shown in the diagram as Memory/Storage Media 16. Typical system memory transactions would include reading data from an ATA/IDE device and storing it in system memory, or reading data from system memory and transferring the data to the ATA/IDE device. Those skilled in the art will recognize that the incorporating system 10 shown in FIG. 1 might be a system-on-chip (SOC), a general purpose computer, a computer workstation, an industrial controller, or any other implementation that requires communication with and control over devices that utilize a standard ATA/IDE communications interface.

Figure 2:
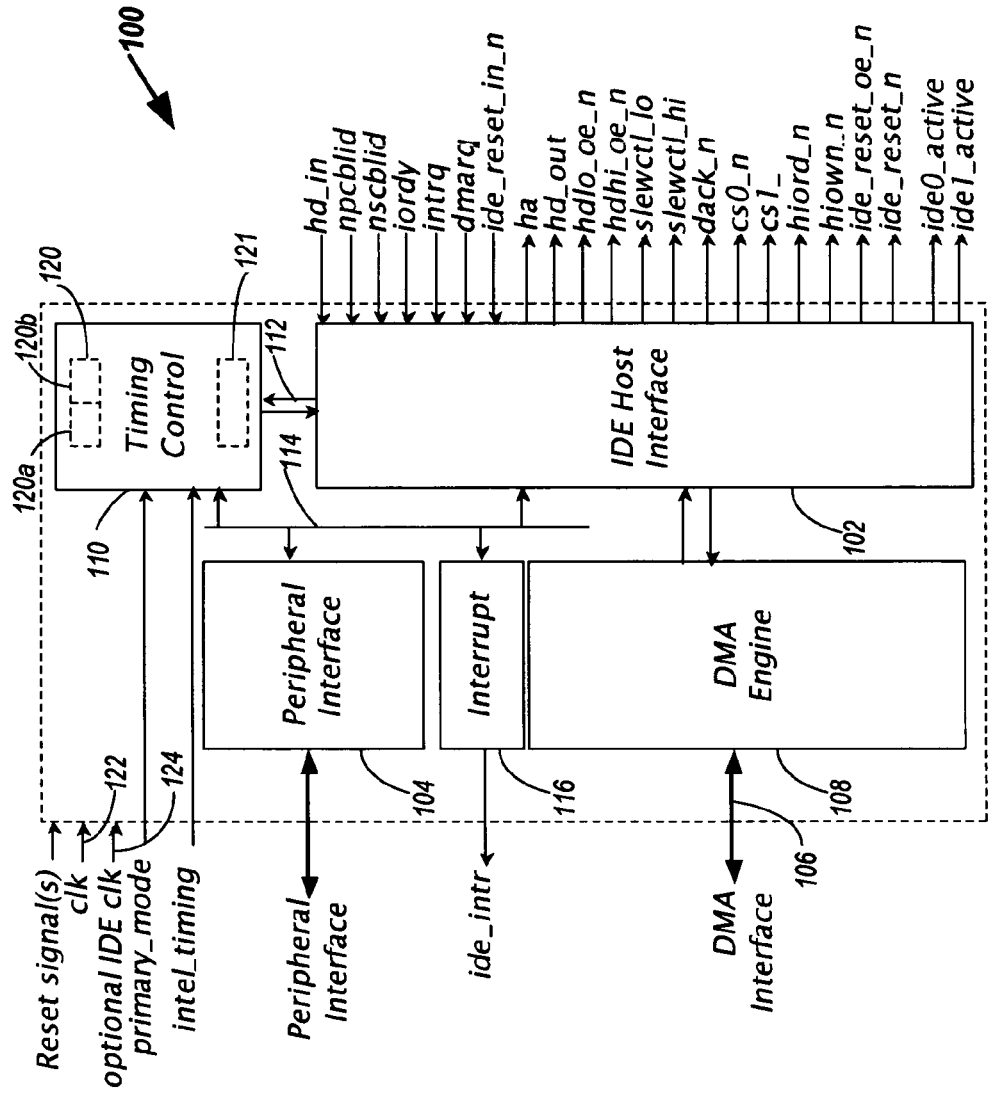
FIG. 2 is a block diagram of the ATA/IDE host controller 100, according to one embodiment of the present invention.

FIG. 2 is a block diagram of the ATA/IDE host controller 100 of the present invention. The host controller 100 interfaces to a host processor through the peripheral interface 104 on one end, and the IDE/ATA interface 102 on the other end. The controller 100 supports multi-word DMA and Ultra DMA data transfers between external IDE/ATAPI devices and a system memory bus interface 106 through the DMA engine 108. The DMA engine 108 controls data transfers to and from system memory over the DMA interface 106 and to and from the FIFO internal to the IDE host interface 102. In one embodiment, the DMA interface 106 can be Palmchip's CoreFrame MBus interface described in U.S. patent application Ser. No. 10/602,581 and the other documents referenced above and incorporated herein. Alternatively, the DMA interface 106 could be the well-known AMBA AHB Master interface, or any other another proprietary or appropriate interface that is supported by the system that includes the host controller 100.

The timing control module 110 controls the proper timing of address, data, and control signals on the IDE interface using the default timing configuration module 120, which includes timing information provided in the timing configuration register set 120a combined with other hard-coded parameters 120b when the controller 100 is operating in a default configuration. Alternatively, timing control module 110 controls the timing of address, data, and control signals using information contained within the SpeedSelect register set 121 when the controller 100 is operating in a configuration other than the default configuration. The timing control module 110 communicates directly with the IDE host interface 102 or with the peripheral interface 104 and the interrupt interface 116 via internal controller bus 114.

Some embodiments of the present invention may not include a default timing configuration module 120, but may instead control the timing of all communications at all frequencies using the SpeedSelect register set 121. As described in further detail below, in embodiments that include a default configuration, the default timing configuration module 120 contains the ATA/IDE host controller's default timing values and control parameters used to control data transfers in systems operating at the frequency for which the host controller 100 has been optimized. The SpeedSelect register set 121 is the storage location for the host controller's programmable timing control registers that, when programmed as described in further detail below, override the default timing control values in default timing configuration module 120.

The peripheral slave interface 104 allows the controller 100 to respond to a peripheral master controller's read or write requests. The peripheral slave interface 104 decodes accesses initiated by an external peripheral master targeted for the SpeedSelect register set 121 or the IDE interface primary or secondary device registers within the IDE host interface function 102. In one embodiment, the peripheral slave interface 104 can be Palmchip's CoreFrame PalmBus interface described in U.S. patent application Ser. No. 10/602,581 and the other documents referenced above and incorporated herein. Alternatively, the peripheral slave interface 104 could be the well-known AMBA AHB Slave interface, or any other another proprietary or appropriate interface that is supported by the system that includes the host controller 100.

As indicated in FIG. 2, the IDE controller can operate using two different clock signals 122 and 124. When configured for single-clock operation, the clock signal 'clk' 122 operates all logic and interfaces. When the core is configured to support two clocks, a second clock signal 124 is used by the IDE logic, and optimally supports fixed frequencies of 33, 66, 100 or 133 MHz. Other frequencies may be used to clock the IDE logic, but may result in less than optimal transfer rates. Frequencies other than the default fixed design frequency require the programming of the SpeedSelect registers 121, which is described in further detail below. Both clocks may be of any duty cycle, as long as positive edge timing matches the desired frequency.

Figure 3:
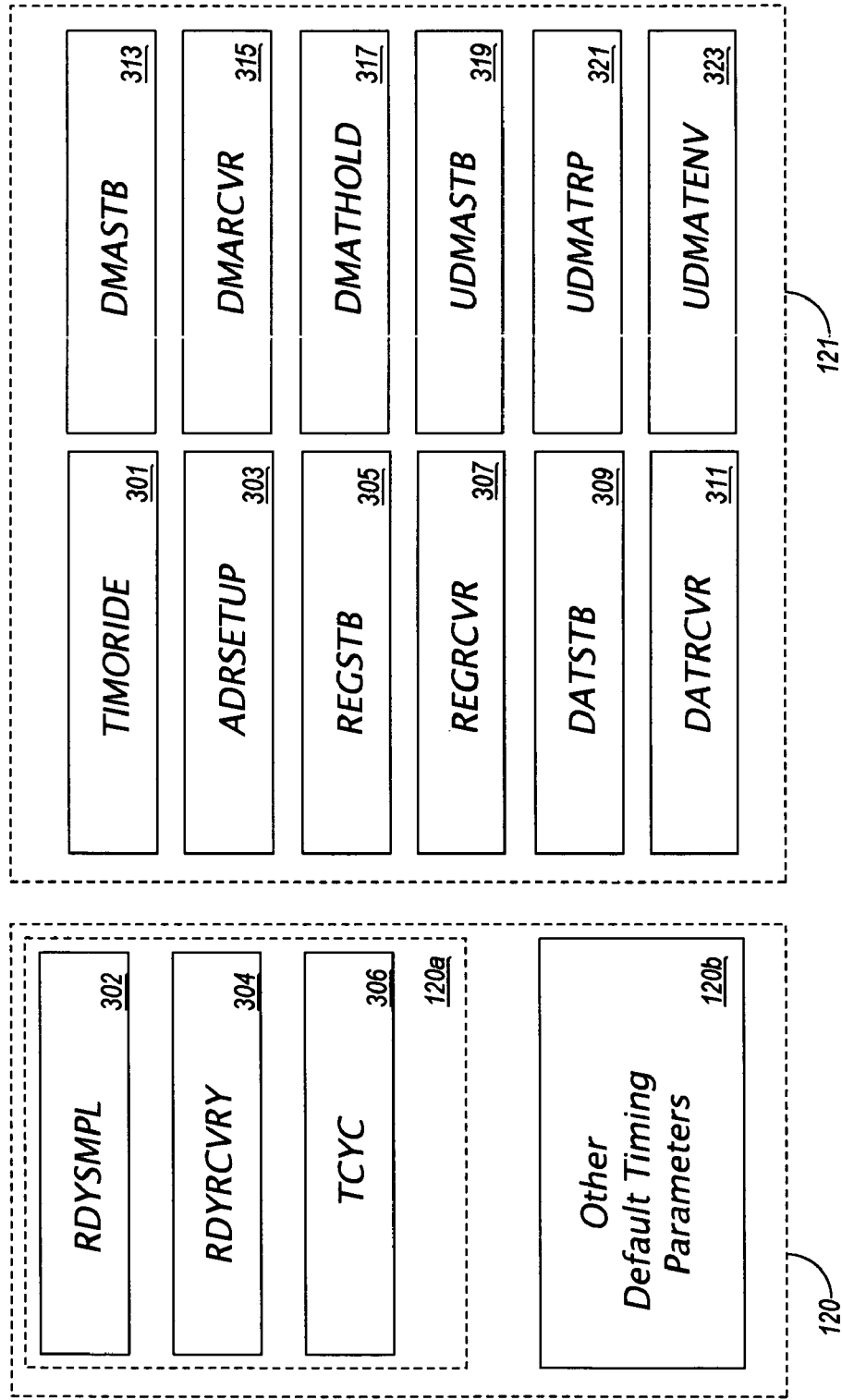
FIG. 3 is a conceptual diagram showing some of the differences between the default timing module 120 and the SpeedSelect register set 121 within the timing control module 110.

FIG. 3 is a conceptual diagram showing some of the differences between the timing control module's default timing configuration module 120 and the SpeedSelect register set 121. As described above, the default timing configuration module 120 controls data transfers across the ATA/IDE interface 102 when the host controller 100 is operating in its default timing configuration, using the default timing parameters in timing configuration registers 120*a* and in timing control logic 120*b*. For clarity, only the timing configuration registers 120*a* that are relevant to the following mode discussion are shown as included within default timing configuration module 120 on FIG. 3. These registers include RDYSMPL 302, RDYRCVRY 304, and TCYC 306. Those skilled in the art and familiar with the ATA/IDE specifications will recognize that FIG. 3 shows only a partial set of the registers and controls that are required to achieve a fully operable IDE host interface. Moreover, those skilled in the art will recognize that the register approach described below is only one way to design in default timing parameters to support one or more data transfer modes of the ATA/IDE specification; there are others well known to those skilled in the art, and many of these design approaches could be used to develop a default host controller configuration without departing from the present invention.

As those familiar with the ATA/IDE specification understand, transfers across the ATA/IDE interface 102 can be categorized into three different types: 8- and 16-bit PIO data transfers (to Taskfile registers and the Data Register), MultiWord DMA accesses, and Ultra DMA accesses. The IDE Host Interface module 102 performs these transfers, handling all timing of IDE signals for PIO and DMA accesses. PIO transfers are used for slower 8-bit transactions to the ATA/IDE device internal taskfile and 8- or 16-bit single data register reads and writes. These transactions are usually initiated by a host processor in a system, but can be generated by other mechanisms as well. MultiWord DMA accesses define a protocol where data words are sent across the ATA/IDE interface without processor intervention using a DMA engine. Ultra DMA defines an even faster protocol that transfers data words at a higher data rate, again without processor intervention and using a DMA engine.

Each of these types of transfer has several timing modes controlled by different sequences of data strobes and control signals; all defined in the ATA/IDE specification. The different timing modes define the minimum or maximum times for data strobe and control signal relationships, including such parameters as setup and hold times for signals, duration of data strobes, and data recovery times. The timing modes allow the interface to run at different transfer speeds for faster data bandwidth. The PIO Data Transfer mode has five different timing modes (Modes 0 through Mode 4), with Mode 0 being the slowest mode of operation (600ns cycle time) and Mode 4 being the fastest (120ns cycle time). Multiword DMA accesses allow for three modes (Mode 0 to Mode 2), with Mode 0 being the slowest mode (480ns cycle time) and Mode 2 being the fastest (120ns cycle time). Ultra DMA provides seven modes (Mode 0 through Mode 6), with Mode 0 being the slowest (480ns cycle time) and Mode 6 being the fastest (30ns cycle time). For Ultra DMA, the different timing modes come from updates and revisions to the specification. The initial Ultra DMA specification defined Modes 0 through 3. Ultra DMA 66 defined timing mode 4, Ultra DMA 100 defined Mode 5, and Ultra DMA 133 defined Mode 6. Table 1 below provides the timing parameters that designers may select as the default operating mode of the host controller 100, along with the values that are stored in registers RDYSMPL 302, RDYRCVRY 304, and TCYC 306 within timing configuration register set 120*a* that correspond to each of these modes.

TABLE 1

|  | PIO | | DMA | | UDMA |
| --- | --- | --- | --- | --- | --- |
|  | RDYSMPL | RDYRCVRY | RDYSMPL | RDYRCVRY | TCYC |
| Mode 0 | 0 (120 ns) | 0 (120 ns) | 0 (120 ns) | 0 (120 ns) | 0 |
| Mode 1 | 1 (100 ns) | 0 (120 ns) | 1 (100 ns) | 1 (100 ns) | 1 |
| Mode 2 | 2 (80 ns) | 1 (100 ns) | 2 (80 ns) | 2 (75 ns) | 2 |
| Mode 3 | 3 (70 ns) | 2 (75 ns) |  |  | 3 |
| Mode 4 | 3 (70 ns) | 3 (50 ns) |  |  | 4[1] |
| Mode 5 |  |  |  |  | 5[2] |
| Mode 6 |  |  |  |  | 6[3] |

[1]Requires 66 MHz, 100 MHz or 133 MHz clock.
[2]UDMA mode 5 operation requires a 100 MHz or 133 MHz clock.
[3]UDMA mode 6 operation requires a 133 MHz clock.

In one embodiment, the RDYSMPL register 302 is a two-bit register that holds a value that corresponds to the amount of time between the assertion of the hiown or hiorn signal and the time when iordy is sampled for PIO and Multiword DMA transfers. A value of 0 in this register corresponds to 120 ns; a value of 1 corresponds to 100 ns; a value of 2 corresponds to 80 ns; and a value of 3 corresponds to 70 ns. The RDYRCVRY register 304 is a two-bit register that holds a value that corresponds to the minimum amount of time between the assertion of iordy and the subsequent assertion of either the hiown or hiorn signal for PIO and Multiword DMA transfers. A value of 0 in this register corresponds to 120 ns; a value of 1 corresponds to 100 ns; a value of 2 corresponds to 75 ns; and a value of 3 corresponds to 50 ns. For each Ultra DMA enabled device, there is a TCYC register 306 within register set 120a that sets the minimum data write strobe cycle time and minimum ready to pause time for the specific operating mode, as those time parameters are defined in the ATA/IDE specifications. Each TCYC register is a three-bit field that holds a value of 0 through 6 that corresponds to the operating mode and frequency for its associated Ultra DMA-enabled device. The TCYC registers are ignored for PIO and multi-word DMA transfers. Those skilled in the art will recognize that while RDYSMPL 302, RDYRCVRY 304, and TCYC 306 are individually described as registers, as a practical matter they are ordinarily assigned bit fields within standard registers of a standard physical size, i.e., 8-bit, 16-bit, 32-bit, and the like.

controller's peripheral interface 104. Four sets of SpeedSelect programming timing registers exist to support the two types of PIO transfers, Multiword DMA transfers, and Ultra DMA transfers. The ADRSETUP 303, REGSTB 305 and REGRCVR 307 registers control the timing parameters for 8-bit accesses of the device Task File registers. The DATSTB 309 and DATRCVR 311 registers control the timing parameters for PIO data accesses, with ADRSETUP 303 also being used. The DMASTB 313 and DMARCVR 315 control timings for multi-word DMA accesses. The UDMASTB 319, UDMATRP 321, and UDMATENV 323 registers control the timing of Ultra DMA accesses.

Table 2 below lists and describes each different register within SpeedSelect register set 121, according to a preferred embodiment of the present invention.

TABLE 2

| Register Name/FIG. 3 reference | Description |
|---|---|
| TIMORIDE 301 | IDE Timing Override Control. This single bit register allows the programmable timing parameters to override the default values. TIMORIDE is set to 0 if IDE interface timing is controlled by default parameters in module 120 and set to 1 if IDE interface timing is controlled by the SpeedSelect registers 121. |
| ADRSETUP 303 | 8-bit Register Address Setup. Stores the number of clock cycles that the address must be held before hiorn or hiown is asserted during accesses to 8-bit ATA/IDE task file registers or data register for master and slave transfers. |
| REGSTB 305 | 8-bit Register Access Strobe Width. Stores the number of clock cycles hiorn and hiown are asserted during accesses to 8-bit ATA/IDE task file registers for master and slave transfers. |
| REGRCVR 307 | 8-bit Register Access Recovery Time. Stores the number of clock cycles between hiorn or hiown negation and assertion during accesses to 8-bit ATA/IDE task file registers for master and slave transfers. |
| DATSTB 309 | Data Register Access Strobe Width. Stores the number of clock cycles hiorn and hiown are asserted during accesses to the ATA/IDE slave device's data register for master and slave transfers. |
| DATRCVR 311 | Data Register Access Strobe Width. Stores the number of clock cycles between hiorn or hiown negation and assertion during access to the ATA/IDE slave device's data register for master and slave transfers. |
| DMASTB 313 | DMA Access Strobe Width. Stores the number of clock cycles hiorn and hiown are asserted during accesses to the ATA/IDE slave device during a Multiword DMA data transfer for master and slave transfers. |
| DMARCVR 315 | DMA Access Recovery Time. Stores the number of clock cycles between hiorn or hiown negation and assertion during accesses to the ATA/IDE slave device during a Multiword DMA data transfer for master and slave transfers. |
| DMATHOLD 317 | DMA Hold Time. Stores the number of clock cycles that hiorn or hiown must be held before DMACKN is asserted during accesses to the ATA/IDE slave device during a Multiword DMA data transfer for master and slave transfers. |
| UDMASTB 319 | Ultra DMA Access Strobe Width. Stores the number of clock cycles hiorn is asserted during accesses to the ATA/IDE slave device during an Ultra DMA data transfer for master and slave transfers. |
| UDMATRP 321 | Ultra DMA Ready to Pause Time. Stores the number of clock cycles between the HREADY and STOP signals during Ultra DMA accesses for master and slave transfers. |
| UDMATENV 323 | Ultra DMA Timing Parameters. Stores the number of clock cycles for the $t_{ACK}$ and $t_{ENV}$ timing parameters during Ultra DMA accesses for master and slave transfers. |

In addition, the embodiment also includes several parameters existing as hard coded constants which are used to define the other relevant timing parameters, including address setup, data hold times, and other ATA timing parameters familiar to those skilled in the art that are not controlled by the registers listed above. The hard coded parameters are pre-calculated for each clock frequency (33, 66, 100 or 133 Mhz) and for each transfer mode and speed. The configuration scripts are used to preserve the proper hard coded parameters for the default frequency and to strip out the other parameters when generating the RTL code base for default timing module 120.

Returning to FIG. 3, SpeedSelect register set 121 contains registers that are programmable through the ATA/IDE Host controller's peripheral interface 104.

Using the above set of registers provides enough programmability of all of the important timing parameters without significantly increasing the gate count of the design. However, those skilled in the art will recognize that other combinations of programmable registers may be used without departing from the present invention. Other than the single-bit TIMORIDE register, each register is 8 bits wide and holds a value that indicates the number of clock cycles required for the specified event or condition. In a preferred embodiment, the value stored in each 8-bit register is the number of clock cycles required minus 1 (e.g., a stored value of 0 indicates that one clock cycle is required for the event or condition.) Additionally, TIMORIDE must be set to "1" for the value stored in each register to be valid.

In a preferred embodiment, the SpeedSelect registers 121 include a register that stores each parameter for each transfer type (master or slave), and a register for each controller channel. For example, in a primary/secondary controller configuration that supports both master and slave transfers, there would be four 8-bit REGSTB registers, where the first register holds the number of clock cycles that hiorn and hiown are asserted during primary controller accesses to 8-bit ATA/IDE task file registers within master devices, a second register holds the number of clock cycles for primary controller accesses to task file registers within slave devices, a third register holds the number of clock cycles for secondary controller accesses to task file registers within master devices, and a fourth register holds the number of clock cycles for secondary controller accesses to task file registers within slave devices. Primary controllers can only read and write the primary registers. Secondary controllers can only read and write the secondary registers. For clarity, FIG. 3 shows only one of each register type. Again, those skilled in the art will recognize that while the SpeedSelect registers described above and in connection with FIG. 3 are individually denoted as "registers", as a practical matter they may be assigned bit fields within standard registers of a standard physical size, i.e., 8-bit, 16-bit, 32-bit, and the like.

As described in detail above, the IDE host controller 100 is pre-configured to operate at a specific clock source frequency (33 MHz, 66 MHz, 100 MHz or 133 MHz to support ATA33, ATA66, ATA100 or ATA133, respectively). However, because the core is completely static, and because the DMA and interface clock domain is independent of the external IDE clock domain, the frequency of the primary clock signal 'clk' 122 may be changed on-the-fly. The frequency of the IDE clock 124 may be changed any time the IDE interface 102 is quiescent. When the IDE clock frequency is changed, timing registers within the SpeedSelect register set 121 must be reprogrammed to accommodate key IDE interface signal timings for Task File accesses, PIO data accesses, multi-word DMA transfers, and Ultra DMA transfers. Reprogramming must be accomplished before initiating any subsequent IDE activity. This allows the host controller 100 to effectively be reconfigured to support a wide range of system clock frequencies and any target interface for all transfer types.

To enable the SpeedSelect programmable timing registers, the TIMORIDE bit in the TIMORIDE register is set to a '1'. When this bit is set to '0', the SpeedSelect registers 121 are disabled and the default timing parameters within default timing configuration module are used. In a preferred embodiment, the TIMORIDE bit is disabled (set to '0') upon power-on reset. Once the bit is set, the values in the programmable timing registers 121 will override the default timing parameters.

As described above, the SpeedSelect timing override registers are programmed with a value indicating the number of clock cycles (minus one) that the IDE controller will wait to meet a particular timing parameter. The user identifies the minimum or maximum value for a timing parameter from the IDE specification, determines the IDE clock frequency, then calculates the number of clock cycles necessary to meet that timing parameter. For example, if the clock frequency is 100 MHz (10 ns period), then to meet a minimum timing requirement of 25ns, at least three clock cycles are required (3 cycles * 10 ns=30 ns). This means that the corresponding timing register that controls the parameter would be programmed with a '2' (three clock cycles minus one). If the system clock frequency is 133 MHz (7.5 ns) and a minimum timing requirement of 50 ns is to be met, this would require at least 7 clock cycles (7 cycles * 7.5 ns=52.5 ns); the timing register should be programmed with a value of '6' to meet this parameter.

The ADRSETUP register is used in reprogramming the address setup timings for both Task File register accesses and PIO data accesses. This defines the number of clock cycles to wait for address setup before the Task File or PIO accesses is initiated through assertion of the hiorn or hiown data strobe. The required IDE timing parameter for the address setup is defined as timing parameter $t_1$ in Table 3 below.

The REGSTB and REGRCVR registers are used in reprogramming the timings for Task File register accesses. The DATSTB and DATRCVR registers are used in reprogramming the timings for PIO data accesses. The required IDE timing parameters for 8-bit Task File register accesses and 8 and 16-bit PIO data accesses are defined in Table 3 below.

TABLE 3

| | PIO Timing Parameters (in ns) | | Mode 0 | Mode 1 | Mode 2 | Mode 3 | Mode 4 | Note |
|---|---|---|---|---|---|---|---|---|
| $t_0$ | Cycle time | (min) | 600 | 383 | 240 | 180 | 120 | 1 |
| $t_1$ | Address valid to HIORN/HIOWN setup | (min) | 70 | 50 | 30 | 30 | 25 | |
| $t_2$ | HIORN/HIOWN  16-bit | (min) | 165 | 125 | 100 | 80 | 70 | 1 |
| | 8-bit | (min) | 290 | 290 | 290 | 80 | 70 | |
| $t_{2i}$ | HIORN/HIOWN recovery time | (min) | — | — | — | 70 | 25 | 1 |
| $t_3$ | HIOWN data setup | (min) | 60 | 45 | 30 | 30 | 20 | |
| $t_4$ | HIOWN data hold | (min) | 30 | 20 | 15 | 10 | 10 | |
| $t_5$ | HIORN data setup | (min) | 50 | 35 | 20 | 20 | 20 | |
| $t_6$ | HIORN data hold | (min) | 5 | 5 | 5 | 5 | 5 | |
| $t_{6Z}$ | HIORN data tristate | (max) | 30 | 30 | 30 | 30 | 30 | 2 |
| $t_9$ | HIORN/HIOWN to address valid hold | (min) | 20 | 15 | 10 | 10 | 10 | |
| $t_{RD}$ | Read Data Valid to IORDY active (if IORDY initially low after $t_A$) | (min) | 0 | 0 | 0 | 0 | 0 | |
| $t_A$ | IORDY Setup time | | | | 35 | 35 | 35 | 35 | 35 | 3 |

TABLE 3-continued

| PIO Timing Parameters (in ns) | | | Mode 0 | Mode 1 | Mode 2 | Mode 3 | Mode 4 | Note |
|---|---|---|---|---|---|---|---|---|
| $t_B$ | IORDY Pulse Width | (max) | 1250 | 1250 | 1250 | 1250 | 1250 | |
| $t_C$ | IORDY assertion to release | (max) | 5 | 5 | 5 | 5 | 5 | |

NOTES

1. $t_0$ is the minimum total cycle time, $t_2$ is the minimum command active time, and $t_{2i}$ is the minimum command recovery time or command inactive time. The actual cycle time equals the sum of the actual command active time and the actual command inactive time. The three timing requirements of $t_0$, $t_2$, and $t_{2i}$ shall be met. The minimum total cycle time requirement is greater than the sum of $t_2$ and $t_{2i}$. This means a host implementation may lengthen either or both $t_2$ or $t_{2i}$ to ensure that $t_0$ is equal to or greater than the value reported in the device's IDENTIFY DEVICE data. A device implementation shall support any legal host implementation.
2. This parameter specifies the time from the negation edge of HIOR- to the time that the data bus is no longer driven by the device (tri-state).
3. The delay from the activation of HIOR- or HIOW- until the state of IORDY is first sampled. If IORDY is inactive then the host shall wait until IORDY is active before the PIO cycle is completed. If the device is not driving IORDY negated at the $t_A$ after the activation of HIOR- or HIOW-, then $t_5$ shall be met and $t_{RD}$ is not applicable. If the device is driving IORDY negated at the time $t_A$ after the activation of HIOR- or HIOW-, then $t_{RD}$ shall be met and $t_5$ is not applicable.

The REGSTB and REGRCVR registers (for task file accesses) and DATSTB and DATRCVR registers (for data accesses) can be programmed to match the parameters $t_0$ (cycle time), $t_2$ (strobe time) and $t_{2i}$ (recovery time). The REGSTB register directly controls the number of clock cycles that the hiorn or hiown strobe will be asserted during 8-bit task file accesses. This corresponds to the strobe width timing parameter, $t_2$. The REGRCVR register defines the number of clock cycles for the recovery time between task file accesses. This corresponds to recovery timing parameter, $t_{2i}$. The sum of both parameters must be equal to or greater than the cycle time, $t_0$.

Likewise, the DATSTB register directly controls the number of clock cycles that the hiorn or hiown strobe will be asserted during the PIO data access. This corresponds to the strobe width timing parameter, $t_2$. The DATRCVR register defines the number of clock cycles for the recovery time for the PIO data access. This corresponds to recovery timing parameter, $t_{2i}$. Again, the sum of both parameters must be equal or greater than the cycle time, $t_0$.

Therefore, with knowledge of the system clock frequency, the user can program these registers with appropriate number of clock cycles to match the timing requirements for task file accesses and PIO data accesses. Note that these timing registers must be programmed with a value one less than the desired number of cycles, so a value of '0' specifies 1 clock cycle, a value of '1' specifies 2 clock cycles, etc. The following examples illustrate programming these SpeedSelect timing registers.

EXAMPLE 1

Programming 8-bit task file accesses for Mode 0 operation using a system clock frequency of 66 Mhz (15ns period). For Mode 0 operation, $t_2$ requires a minimum of 290ns, so this translates to using a minimum of 20 clock cycles (20 cycles * 15ns=300ns). There is no requirement for $t_{2i}$ in Mode 0 operation, but $t_0$ requires a minimum of 600ns, or 40 clock cycles. This means REGSTB and REGRCVR can be programmed to specify any combination equaling forty (or more) clock cycles, with REGSTB specifying at least 20 clock cycles. In addition, the minimum address setup time $t_1$ for Mode 0 operation is 70 ns, so this requires the ADRSETUP register to be programmed to a minimum of 5 clock cycles (5 * 15ns=75ns). Sample programming values are REGSTB=0×13 (20 clock cycles) and REGRCVR=0×13 (20 clock cycles), or REGSTB=0×1F (32 clock cycles) and REGRCVR=0×7 (8 clock cycles), with ADRSETUP=0×4 (5 clock cycles).

EXAMPLE 2

Programming 8-bit task file accesses for Mode 4 operation using a system clock frequency of 100 Mhz (10ns period). For Mode 4 operation, $t_2$ requires a minimum of 70ns, which translates to a minimum of 7 clock cycles (7 cycles * 10ns=70 ns). $t_{2i}$ is defined to be at least 25ns, which translates to a minimum of 3 clock cycles (3 cycles * 10ns=30ns). The minimum cycle time $t_0$ is 120 ns, or 12 clock cycles. This means that REGSTB and REGRCVR can be programmed to specify any combination equaling 12 (or more) clock cycles, with REGSTB specifying at least 7 cycles and REGRCVR specifying at least 3 cycles. In addition, the minimum address setup time $t_1$ for Mode 4 operation is 25ns, so this requires the ADRSETUP register to be programmed to a minimum of 3 clock cycles (3 * 10ns=30ns). Sample programming values are REGSTB=0×7 (8 clock cycles) and REGRCVR=0×3 (4 clock cycles), or REGSTB=0×8 (9 clock cycles) and REGRCVR=0×2 (3 clock cycles), with ADRSETUP=0×2 (3 clock cycles).

EXAMPLE 3

Programming PIO data accesses for Mode 2 operation using a system clock frequency of 33 Mhz (30ns period). For Mode 2 operation, $t_2$ requires a minimum of 100 ns, so this translates to using a minimum of 4 clock cycles (4 cycles * 30ns=120ns). There is no requirement for $t_{2i}$ in Mode 2 operation, but the minimum requirement for $t_0$ is 240ns, or 8 clock cycles. This means DATSTB and DATRCVR can be DATSTB specifying at least 4 clock cycles. In addition, the minimum address setup time $t_1$ for Mode 2 operation is 30ns, so this requires the ADRSETUP register to be programmed to a minimum of 1 clock cycle (30ns). Sample programming values might be DATSTB=0×3 (4 clock cycles) and DATRCVR=0×3 (4 clock cycles), or DATSTB=0×5 (6 clock cycles) and DATRCVR=0×1 (2 clock cycles), with ADRSETUP=0×1 (2 clock cycles).

EXAMPLE 4

Programming PIO data accesses for Mode 3 operation using a system clock frequency of 133 Mhz (7.5 ns period). For Mode 3 operation, $t_2$ requires a minimum of 80ns, so this translates to using a minimum of 11 clock cycles (11 cycles*7.5 ns=82.5 ns). The minimum requirement on $t_{2i}$ is defined to be 70 ns, which translates to a minimum of 10 clock cycles (10 cycles *7.5 ns=75 ns). The minimum cycle time to is 180 ns, or 24 clock cycles. This means that DATSTB and DATRCVR can be programmed to specify any combination equaling 24 (or more) clock cycles, with DATSTB specifying at least 11 cycles and DATRCVR specifying at least 10 cycles. In addition, the minimum address setup time $t_1$ for Mode 3 operation is 30 ns, so this requires the ADRSETUP register to be programmed to a minimum of 4 clock cycles (4* 7.5 ns=30 ns). Sample values are DATSTB=0xB (12 clock cycles) and DATRCVR=0xB (12 clock cycles), or DATSTB=0xD (14 clock cycles) and DATRCVR=0x9 (10 clock cycles), with ADRSETUP=0x4 (5 clock cycles).

The DMASTB and DMARCVR registers are used in reprogramming the timings for multi-word DMA transfers. The required IDE timing parameters for multi-word DMA transfers are defined in Table 4 below.

The following examples illustrate programming the DMASTB and DMARCVR timing registers.

EXAMPLE 5

Programming multi-word DMA transfers for Mode 0 operation using a system clock frequency of 66 Mhz (15 ns period). For Mode 0 operation, $t_D$ is a minimum of 215 ns, which translates to a minimum of 15 clock cycles at 66 Mhz (15 cycles *15 ns=225 ns). The minimum requirement for $t_{KW}$ is 215 ns (for writes), which translates to at least 15 clock cycles (15 cycles *15 ns=225 ns). The minimum requirement for $t_0$ is 480 ns, or 32 clock cycles. This means DMASTB and DMARCVR can be programmed to specify any combination equaling 32 (or more) clock cycles, where both DMASTB and DMARCVR must be at least 15 clock cycles. Sample specification values are DMASTB=0xF (16 clock cycles) and DMARCVR=0xF (16 clock cycles), or DMASTB=0x10 (17 clock cycles) and DMARCVR=0xE (15 clock cycles).

TABLE 4

| Multiword DMA Timing Parameters (in ns) | | Mode 0 | Mode 1 | Mode 2 | Note |
|---|---|---|---|---|---|
| $t_0$ | Cycle time (min) | 480 | 150 | 120 | see note |
| $t_D$ | HIORN/HIOWN (min) | 215 | 80 | 70 | see note |
| $t_E$ | HIORN data access (max) | 150 | 60 | 50 | |
| $t_F$ | HIORN data hold (min) | 5 | 5 | 5 | |
| $t_G$ | HIORN/HIOWN data setup (min) | 100 | 30 | 20 | |
| $t_H$ | HIOWN data hold (min) | 20 | 15 | 10 | |
| $t_I$ | DMACKN to HIORN/HIOWN setup (min) | 0 | 0 | 0 | |
| $t_J$ | HIORN/HIOWN to DMACKN hold (min) | 20 | 5 | 5 | |
| $t_{KR}$ | HIORN negated pulse width (min) | 50 | 50 | 25 | see note |
| $t_{KW}$ | HIOWN negated pulse width (min) | 215 | 50 | 25 | see note |
| $t_{LR}$ | HIORN to DMARQ delay (max) | 120 | 40 | 35 | |
| $t_{LW}$ | HIOWN to DMARQ delay (max) | 40 | 40 | 35 | |
| $t_Z$ | DMACKN to tri-state (max) | 20 | 25 | 25 | |

NOTE
$t_0$ is the minimum total cycle time, $t_D$ is the minimum command active time, and $t_K$ ($t_{KR}$ or $t_{KW}$, as appropriate) is the minimum command recovery time or command inactive time. The actual cycle time equals the sum of the actual command active time and the actual command inactive time. The three timing requirements of $t_0$, $t_D$, $t_K$ shall be met. The minimum total cycle time requirement, $t_0$, is greater than the sum of $t_D$ and $t_K$. This means a host implementation may lengthen either or both $t_D$ or $t_K$ to ensure that $t_0$ is equal to the value reported in the devices IDENTIFY DEVICE data. A device implementation shall support any legal host implementation.

The DMASTB and DMARCVR registers can be programmed to match the parameters $t_0$ (cycle time), $t_D$ (strobe time) and tKR and $t_{KW}$ (recovery times for DMA read and write) as defined in Table 4. The DMASTB register directly controls the number of clock cycles that the hiorn or hiown strobe will be asserted during multi-word DMA transfers. This corresponds to the strobe width timing parameter, $t_D$. The DMARCVR defines the number of clock cycles for the recovery time for multi-word DMA transfers. This corresponds to recovery timing parameters, $t_{KR}$ and $t_{KW}$. The sum of both parameters must be equal or greater than the cycle time, $t_0$. With knowledge of the system clock frequency, the user can program the appropriate number of clock cycles to match the timing requirements. As described above in connection with the PIO-related registers, the timing registers associated with multi-word DMA transfers must be programmed with a value one less than the desired number of cycles, so a value of '0' specifies 1 clock cycle, a value of '1' specifies 2 clock cycles, etc.

EXAMPLE 6

Programming multi-word DMA transfers for Mode 2 operation using a system clock frequency of 100 Mhz (10ns period). For Mode 2 operation, $t_D$ is a minimum of 70ns, which translates to a minimum of 7 clock cycles (7 cycles *10 ns=70 ns). $t_{KW}$ is defined to be at least 25 ns, which translates to using a minimum of 3 clock cycles (3 cycles*10 ns=30 ns). The minimum cycle time t0 is 120 ns, or 12 clock cycles. This means that DMASTB and DMARCVR can be programmed to specify any combination equaling 12 (or more) clock cycles, with DMASTB specifying at least 7 cycles and DMARCVR specifying at least 3 cycles. Sample programming values are DMASTB=0x7 (8 clock cycles) and DMARCVR=0x3 (4 clock cycles), or DMASTB=0x8 (9 clock cycles) and DMARCVR=0x2 (3 clock cycles).

The UDMASTB, UDMATRP and UDMATENV registers are used in reprogramming the timings for Ultra DMA transfers. The required IDE timing parameters for Ultra DMA transfers are defined in Table 5 below.

TABLE 5

Ultra DMA Data Burst Timing Requirements

| Name | Mode 0 (in ns) | | Mode 1 (in ns) | | Mode 2 (in ns) | | Mode 3 (in ns) | | Mode 4 (in ns) | | Mode 5 (in ns) | | Mode 6 (in ns) | | Notes[1] |
|---|---|---|---|---|---|---|---|---|---|---|---|---|---|---|---|
| | Min | Max | Min | Max | Min | Max | Min | Max | Min | Max | Min | Max | Min | Max | |
| $t_{2CYCTYP}$ | 240 | | 160 | | 120 | | 90 | | 60 | | 40 | | 30 | | S |
| $t_{CYC}$ | 112 | | 73 | | 54 | | 39 | | 25 | | 16.8 | | 13.0 | | R |
| $t_{2CYC}$ | 230 | | 153 | | 115 | | 86 | | 57 | | 38 | | 29 | | S |
| $t_{DS}$ | 15.0 | | 10.0 | | 7.0 | | 7.0 | | 5.0 | | 4.0 | | 2.6 | | R |
| $t_{DH}$ | 5.0 | | 5.0 | | 5.0 | | 5.0 | | 5.0 | | 4.6 | | 3.5 | | R |
| $t_{DVS}$ | 70.0 | | 48.0 | | 31.0 | | 20.0 | | 6.7 | | 4.8 | | 4.0 | | S |
| $t_{DVH}$ | 6.2 | | 6.2 | | 6.2 | | 6.2 | | 6.2 | | 4.8 | | 4.0 | | S |
| $t_{CS}$ | 15.0 | | 10.0 | | 7.0 | | 7.0 | | 5.0 | | 5.0 | | 5.0 | | D |
| $t_{CH}$ | 5.0 | | 5.0 | | 5.0 | | 5.0 | | 5.0 | | 5.0 | | 5.0 | | D |
| $t_{CVS}$ | 70.0 | | 48.0 | | 31.0 | | 20.0 | | 6.7 | | 10.0 | | 10.0 | | H |
| $t_{CVH}$ | 6.2 | | 6.2 | | 6.2 | | 6.2 | | 6.2 | | 10.0 | | 10.0 | | H |
| $t_{ZFS}$ | 0 | | 0 | | 0 | | 0 | | 0 | | 35 | | 25 | | D |
| $t_{DZFS}$ | 70.0 | | 48.0 | | 31.0 | | 20.0 | | 6.7 | | 25 | | 17.5 | | S |
| $t_{FS}$ | | 230 | | 200 | | 170 | | 130 | | 120 | | 90 | | 80 | D |
| $t_{LI}$ | 0 | 150 | 0 | 150 | 0 | 150 | 0 | 100 | 0 | 100 | 0 | 75 | 0 | 60 | (2) |
| $t_{MLI}$ | 20 | | 20 | | 20 | | 20 | | 20 | | 20 | | 20 | | H |
| $t_{UI}$ | 0 | | 0 | | 0 | | 0 | | 0 | | 0 | | 0 | | H |
| $t_{AZ}$ | | 10 | | 10 | | 10 | | 10 | | 10 | | 10 | | 10 | (3) |
| $t_{ZAH}$ | 20 | | 20 | | 20 | | 20 | | 20 | | 20 | | 20 | | H |
| $t_{ZAD}$ | 0 | | 0 | | 0 | | 0 | | 0 | | 0 | | 0 | | D |
| $t_{ENV}$ | 20 | 70 | 20 | 70 | 20 | 70 | 20 | 55 | 20 | 55 | 20 | 50 | 20 | 50 | H |
| $t_{RFS}$ | | 75 | | 70 | | 60 | | 60 | | 60 | | 50 | | 50 | S |
| $t_{RP}$ | 160 | | 125 | | 100 | | 100 | | 100 | | 85 | | 85 | | R |
| $t_{IORDYZ}$ | | 20 | | 20 | | 20 | | 20 | | 20 | | 20 | | 20 | D |
| $t_{ZIORDY}$ | 0 | | 0 | | 0 | | 0 | | 0 | | 0 | | 0 | | D |
| $t_{ACK}$ | 20 | | 20 | | 20 | | 20 | | 20 | | 20 | | 20 | | H |
| $t_{SS}$ | 50 | | 50 | | 50 | | 50 | | 50 | | 50 | | 50 | | S |

NOTES
[1] All signal transitions for a timing parameter shall be measured at the connector specified in the "Notes" column, where "H" = host, "D" = device, "S" = sender and "R" = recipient. For example, in the case of $t_{RFS}$, both STROBE and DMARDY- transitions are measured at the sender connector.
[2] The parameter $t_{LI}$ shall be measured at the connector of the sender or recipient that is responding to an incoming transition from the recipient or sender respectively. Both the incoming signal and the outgoing response shall be measured at the same connector.
[3] The parameter $t_{AZ}$ shall be measured at the connector of the sender or recipient that is releasing the bus.

The UDMASTB, UDMATRP and UDMATENV registers can be programmed to match the parameters $t_{CYC}$ (cycle time) and $t_{2CYC}$ (two cycle time), $t_{RP}$ (ready-to-pause), and $t_{ENV}$ (time envelope) as defined in this table. The UDMASTB register directly controls the number of clock cycles for the Ultra DMA strobe during Ultra DMA transfers. This corresponds to the strobe width timing parameter, $t_{CYC}$. The UDMATRP register defines the number of clock cycles for the ready-to-pause timing parameter, $t_{RP}$. The UDMATENV register indicates the number of clock cycles for the timing envelope timing parameter, $t_{ENV}$. With knowledge of the system clock frequency, the user can program the appropriate number of clock cycles to match the timing requirements. Again, these timing registers must be programmed with a value one less than the desired number of clock cycles, so a value of '0' specifies 1 clock cycle, a value of '1' specifies 2 clock cycles, etc.

The following examples illustrate programming timing registers UDMASTB, UDMATRP and UDMATENV.

EXAMPLE 7

Programming Ultra DMA transfers for Mode 5 operation using a system clock frequency of 100 Mhz (10 ns period). As indicated in Table 5 above, for Mode 5 operation, $t_{2CYC}$ must be at least 38 ns. This translates to a minimum of 2 clock cycles (2 cycles *10 ns=20 ns) per UDMA cycle. The timing requirement on $t_{RP}$ is at least 85 ns, which translates to a minimum of 9 clock cycles (9 cycles *10 ns=90 ns). $t_{ENV}$ has a minimum value of 20 ns and a maximum value of 50 ns, so this parameter needs to be anywhere from 2 to 5 clock cycles (2 *10 ns=20 ns, 5*10 ns=50 ns). Sample programming values are UDMASTB=0×1 (2 clock cycles), UDMATRP=0×8 (9 clock cycles), and UDMATENV=0×2 (3 clock cycles).

EXAMPLE 8

Programming Ultra DMA transfers for Mode 6 operation using a system clock frequency of 133 Mhz (7.5ns period). For Mode 6 operation, $t_{2CYC}$ must be at least 29 ns, which translates to a minimum of 2 clock cycles (2 cycles*7.5 ns=15 ns) per UDMA cycle. The timing requirement on $t_{RP}$ is at least 85ns, which translates to a minimum of 12 clock cycles (12 cycles *7.5ns=90ns). $t_{ENV}$ has a minimum value of 20 ns and a maximum value of 50 ns, so this parameter needs to be anywhere from 3 to 6 clock cycles (3 cycles * 7.5ns=22.5 ns; 6 cycles*7.5 ns=45 ns). Sample programming values are UDMASTB=0×1 (2 clock cycles), UDMATRP=0×B (12 clock cycles), and UDMATENV=0×3 (4 clock cycles).

After studying these examples, those skilled in the art will recognize that system designers can readily implement a programming algorithm or table that will enable on-the-fly programming of the SpeedSelect control registers at power-on-reset and any time the frequency of the relevant clock signal changes, such as might occur when the system that includes the present invention implements a power saving feature or heat reduction feature.

In summary, the present invention is an ATA/IDE host controller generated from an HDL design base and a configuration script that supports ATA/IDE interface communications at a configured default frequency of 33, 66, 100, or 133 Mhz and at operating frequencies other than the default frequency using a set of programmable override timing registers. The host controller includes an IDE host interface and a timing control module that provides either the default timing parameters or the override timing parameters to the IDE host interface, according to the override control. The default timing parameters are defined according a clock signal having a user-selected default frequency, and the override timing parameters are calculated using the period of a clock signal having a frequency different from the user-selected default frequency. The override control is reset to the default configuration at power-on-reset, and if the default clock frequency changes to a new frequency, the present invention allows the default timing configuration to be overridden by programmable override timing parameters that are determined according to the new clock frequency. Override timing parameters can be changed on the fly.

In the present invention, the override timing parameters define either the number of clock cycles that must elapse after a specified signal communicating over said IDE interface is asserted before a specified event happens, or the number of clock cycles that must elapse after a specified signal communicating over said IDE interface is asserted before a specified event happens.

Other embodiments of the invention will be apparent to those skilled in the art after considering this specification or practicing the disclosed invention. The specification and examples above are exemplary only, with the true scope of the invention being indicated by the following claims.

We claim the following invention:

1. An ATA/IDE host controller apparatus, comprising:
   an IDE host interface that communicates with ATA/IDE devices in accordance with a user-specified protocol; and
   a timing control module that further comprises a set of programmable override timing registers that store override timing parameters that control communications performed by said IDE host interface, wherein the override timing parameters are calculated using a system clock frequency.

2. An system incorporating an ATA/IDE host controller apparatus, comprising:
   an IDE host interface that communicates with ATA/IDE devices in accordance with a user-specified protocol; and
   a timing control module that further comprises a set of programmable override timing registers that store override timing parameters that control communications performed by said IDE host interface, wherein the override timing parameters are calculated using a system clock frequency.

3. A method to make an ATA/IDE host controller apparatus, comprising:
   providing an IDE host interface that communicates with ATA/IDE devices in accordance with a user-specified protocol; and
   coupling a timing control module to said IDE host interface, said timing control module further comprises a set of programmable override timing registers that store override timing parameters that control communications performed by said IDE host interface, wherein the override timing parameters are calculated using a system clock frequency.

4. A method to use an ATA/IDE host controller apparatus, comprising:
   communicating with ATA/IDE devices in accordance with a user-specified protocol using an IDE host interface; and
   controlling communications over said IDE host interface using override timing parameters, wherein the override timing parameters are calculated using a system clock frequency.

5. A program storage device readable by a computer that tangibly embodies a program of instructions executable by the computer to perform a method to use an ATA/IDE host controller apparatus, comprising:
   communicating with ATA/IDE devices in accordance with a user-specified protocol using an IDE host interface; and
   controlling communications over said IDE host interface using override timing parameters, wherein the override timing parameters are calculated using a system clock frequency.

6. A dependent claim according to claims 1, 2 or 3, wherein
   said timing control module farther comprises a set of default timing control parameters defined according to the period of a system clock signal received by said host controller that has a user-selected default frequency, and said default timing control parameters control communications over said IDE interface in lieu of said override timing parameters when said host controller receives said system clock signal having said user-selected default frequency.

7. A dependent claim according to claim 6 wherein said override timing parameters further comprise a first set of override timing parameters calculated using the period of a system clock signal having a first frequency that is different from said user-selected default frequency, and said first set of override timing parameters control communications over said IDE interface when said host controller receives said system clock signal having said first frequency.

8. A dependent claim according to claim 7 wherein said first set of override timing parameters change to a second set of override timing parameters calculated using the period of a system clock signal having a second frequency different from said first frequency or said user-selected default frequency, and said second set of override timing parameters control communications over said IDE interface when said host controller receives said system clock signal having said second frequency.

9. A dependent claim according to claims 1, 2, 3, 4, or 5 wherein said override timing parameters further comprise one of the following: the number of clock cycles that must elapse after a specified signal communicating over said IDE interface is asserted to meet a particular timing requirement of an ATA/IDE transaction, or the number of clock cycles that must elapse to meet a particular timing requirement of an ATA/IDE transaction, or the number of clock cycles that must elapse after a specified signal communicating over said IDE interface is negated to meet a particular timing requirement of an ATA/IDE transaction.

10. A dependent claim according to claim 6 wherein the design of said host controller apparatus is generated from a hardware description language design base and a configuration script, wherein said hardware description language design base and said configuration script generate a host controller apparatus design having default timing parameters optimized for one of the following default operating frequencies: 33 Mhz, 66 Mhz, 100 Mhz, or 133 Mhz.

11. A computer implemented method for communicating with ATA/IDE devices over an IDE host interface using an ATA protocol, the method comprising:
   at power-on-reset, obtaining default timing parameters stored in default timing registers;
   in response to detecting a change in a system clock frequency from a default system clock frequency to a different system clock frequency, calculating, using at least in part the different system clock frequency, a set of override timing parameters;
   storing the set of override timing parameters in override timing registers;
   after the change from the default system clock frequency to the different system clock frequency, communicating with at least one ATA/IDE device over the IDE host interface using, at least in part, the set of override timing parameters rather than the default timing parameters.

12. The ATA/IDE host controller apparatus of claim 1 wherein the timing control module further comprises a set of default timing registers that store default timing parameters, wherein the default timing parameters control communications performed by said IDE host interface at times that a system clock is operating at a default clock frequency, and wherein the override timing parameters control communications performed by said IDE host interface at times that the system clock is operating at a frequency other than the default clock frequency.

13. The system of claim 2 wherein the timing control module further comprises a set of default timing registers that store default timing parameters, wherein the default timing parameters control communications performed by said IDE host interface at times that a system clock is operating at a default clock frequency, and wherein the override timing parameters control communications performed by said IDE host interface at times that the system clock is operating at a frequency other than the default clock frequency.

14. The method of claim 4 further comprising:
   controlling communications over said IDE host interface using default timing parameters defined according to the period of a system clock signal received by said host controller that has a user-selected default frequency and said default timing parameters control communications over said IDE host interface in lieu of said override timing parameters when said host controller receives said system clock signal having said user-selected default frequency, wherein said user-selected default frequency is different from the system clock frequency.

15. The method of claim 14 further comprising:
   controlling communications over said IDE host interface using different override timing parameters, wherein the different override timing parameters are calculated using the period of the system clock signal having a second system clock frequency, different from the system clock frequency or said user-selected default frequency, and said different override timing parameters control communications over said IDE host interface when said host controller receives said system clock signal having said second system clock frequency.

16. The program storage device of claim 5 further comprising:
   controlling communications over said IDE host interface using default timing parameters defined according to the period of a system clock signal received by said host controller that has a user-selected default frequency and said default timing parameters control communications over said IDE host interface in lieu of said override timing parameters when said host controller receives said system clock signal having said user-selected default frequency, wherein said user-selected default frequency is different from the system clock frequency.

17. The method of claim 16 further comprising:
   controlling communications over said IDE host interface using different override timing parameters, wherein the different override timing parameters are calculated using the period of the system clock signal having a second system clock frequency, different from the system clock frequency or said user-selected default frequency, and said different override timing parameters control communications over said IDE host interface when said host controller receives said system clock signal having said second system clock frequency.

18. The method of claim 4 wherein the override timing parameters control communications over said IDE host interface at times that a system clock is operating at a frequency other than a default clock frequency, and wherein default timing parameters control communications over said IDE host interface at times that the system clock is operating at the default clock frequency.

19. The program storage device of claim 5 wherein the override timing parameters control communications over said IDE host interface at times that a system clock is operating at a frequency other than a default clock frequency, and wherein default timing parameters control communications over said IDE host interface at times that the system clock is operating at the default clock frequency.

* * * * *

UNITED STATES PATENT AND TRADEMARK OFFICE
CERTIFICATE OF CORRECTION

| | | |
|---|---|---|
| PATENT NO. | : 7,275,120 B2 | Page 1 of 1 |
| APPLICATION NO. | : 10/846739 | |
| DATED | : September 25, 2007 | |
| INVENTOR(S) | : Ou et al. | |

It is certified that error appears in the above-identified patent and that said Letters Patent is hereby corrected as shown below:

Column 14, lines 53-54: "This means DATSTB and DATRCVR can be DATSTB specifying" should be -- This means DATSTB and DATRCVR can be programmed to specify any combination that equals 8 (or more) clock cycles, with DATSTB specifying --.

Column 17, Table 5: "$t_{Rp}$" should be -- $t_{RP}$ --.

Signed and Sealed this

Thirteenth Day of January, 2009

JON W. DUDAS
*Director of the United States Patent and Trademark Office*